United States Patent [19]

Smith et al.

[11] Patent Number: 4,799,251
[45] Date of Patent: Jan. 17, 1989

[54] ESS EQUIPMENT TESTING DEVICE

[75] Inventors: Richard B. Smith, Lugoff; Michael T. Tolson, Elgin, both of S.C.

[73] Assignee: Bell South Corporation, Atlanta, Ga.

[21] Appl. No.: 101,670

[22] Filed: Sep. 28, 1987

[51] Int. Cl.$^4$ .............................................. H04M 1/24
[52] U.S. Cl. .......................................... 379/1; 379/21; 379/29; 379/429; 361/426
[58] Field of Search .................... 379/1, 21, 22, 25, 27, 379/29, 428, 429, 434; 324/149, 158 F; 361/426, 422, 425

[56] References Cited

U.S. PATENT DOCUMENTS 4,217,023  8/1980  Petit et al. ...................... 361/426 X Primary Examiner—Stafford D. Schreyer
Attorney, Agent, or Firm—Jones, Askew & Lunsford

[57] ABSTRACT

An equipment testing device facilitates the testing of telephone communications systems having a number of predetermined test terminals. The equipment testing device includes a housing with a plurality of electrodes mounted on the housing. Means are provided for connecting the electrodes to the predetermined test terminals and for correlating the electrodes and the test terminals so that a selected electrode is an extension of a selected test terminal.

35 Claims, 4 Drawing Sheets

U.S. Patent  Jan. 17, 1989  Sheet 1 of 4  4,799,251
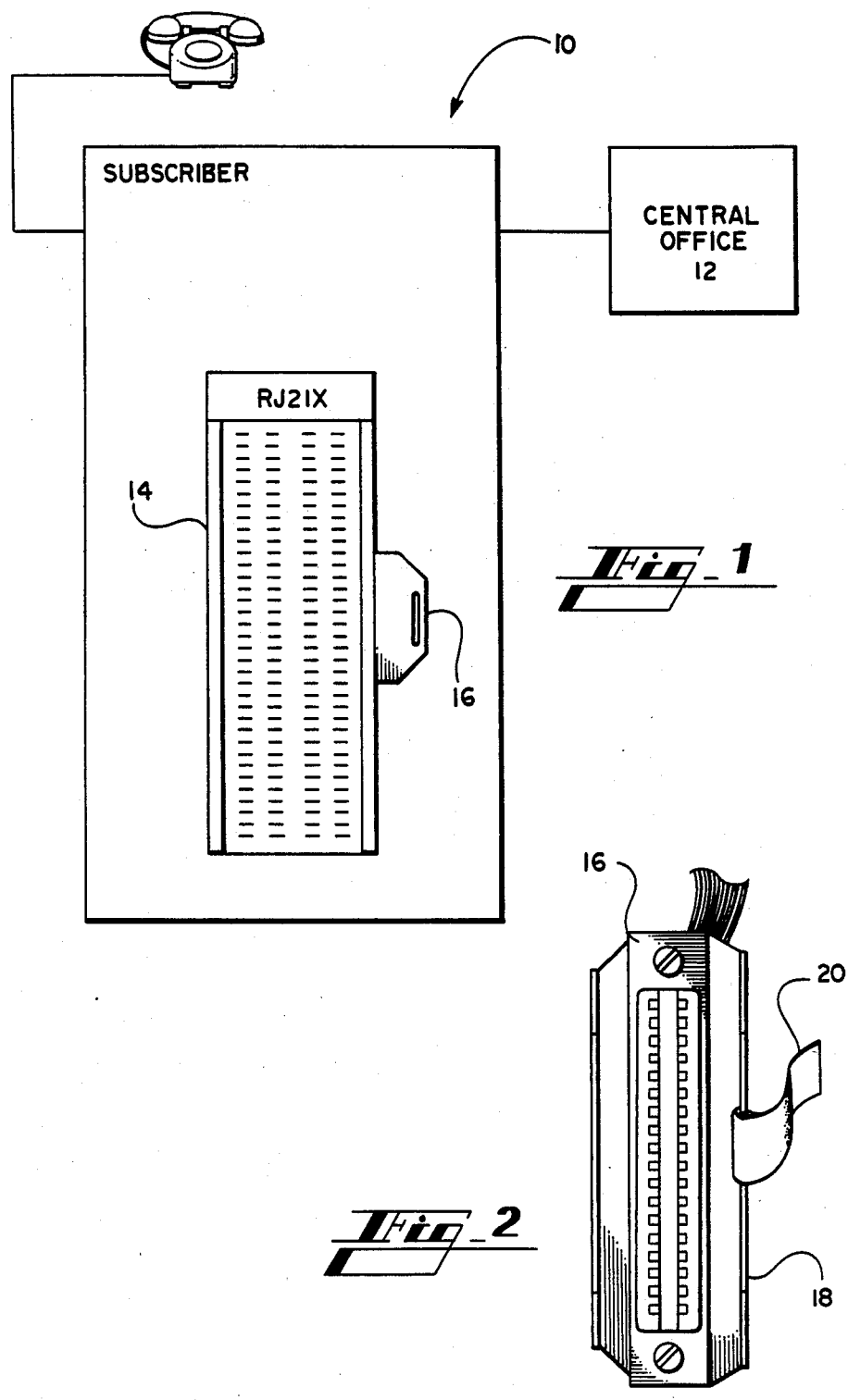

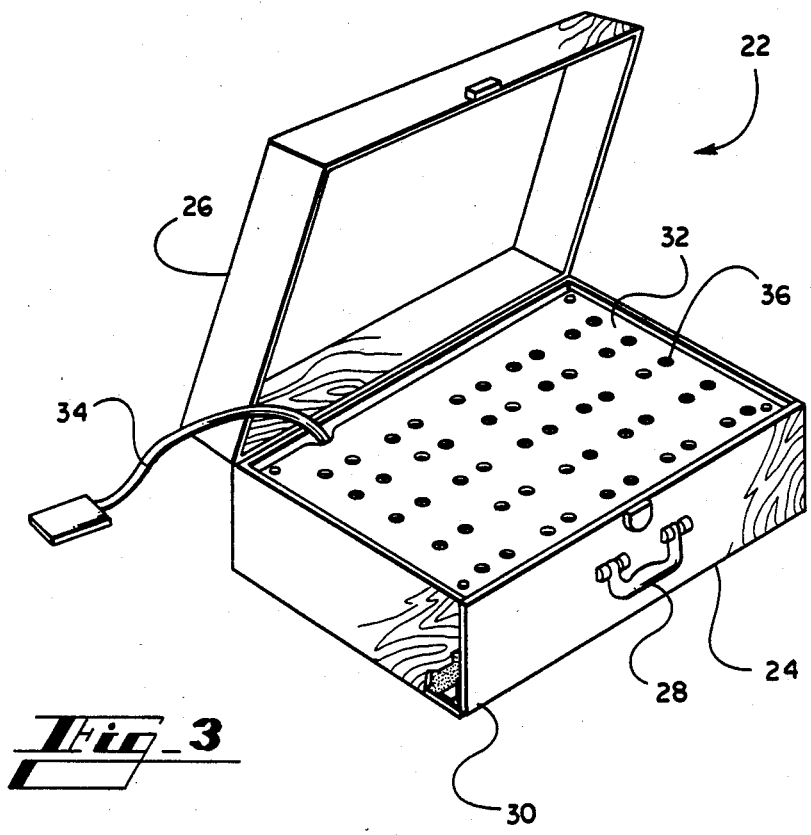
Fig_3

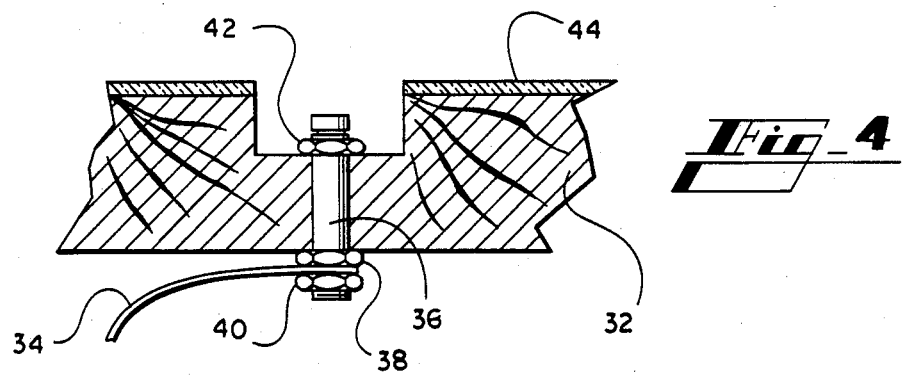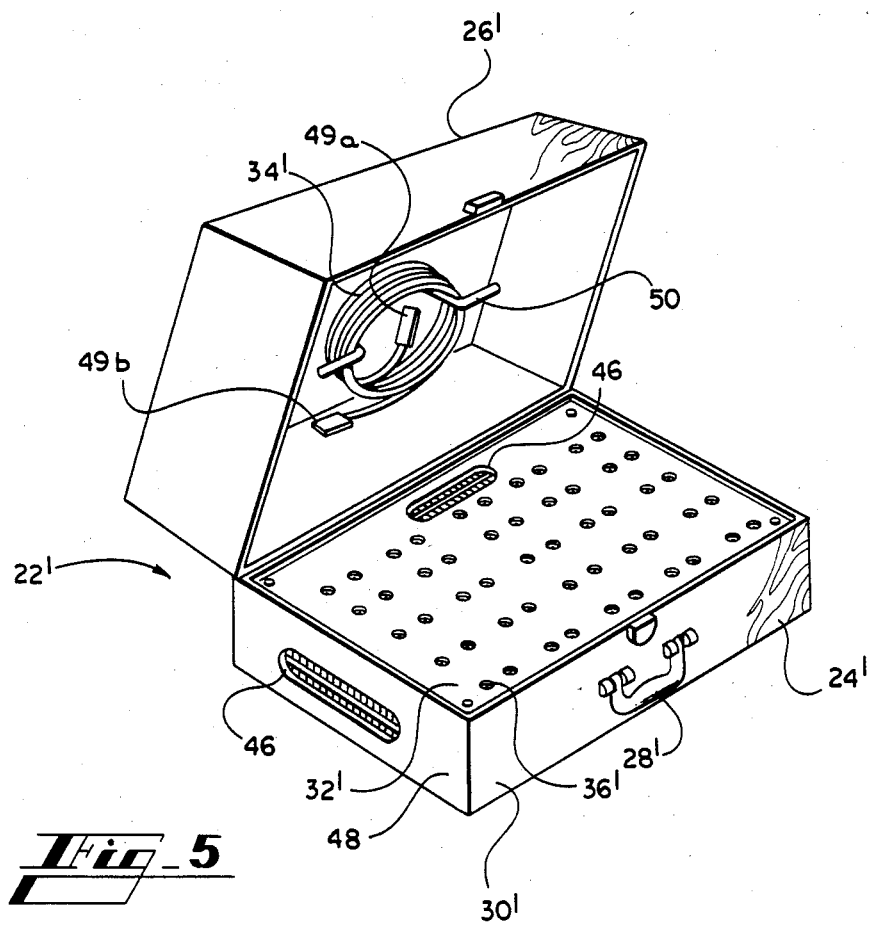

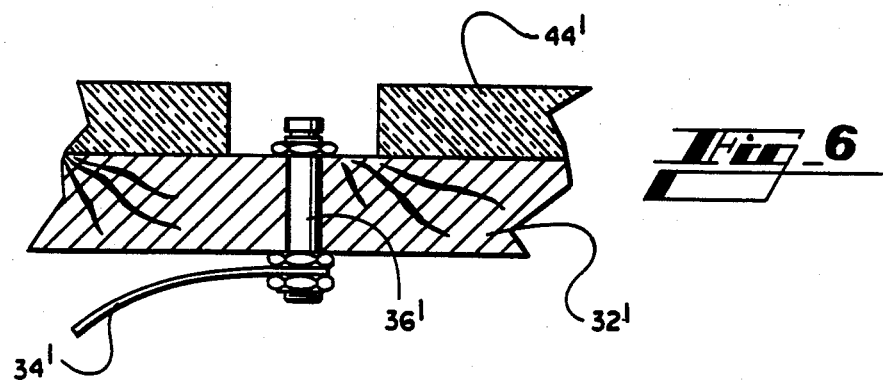
Fig_6
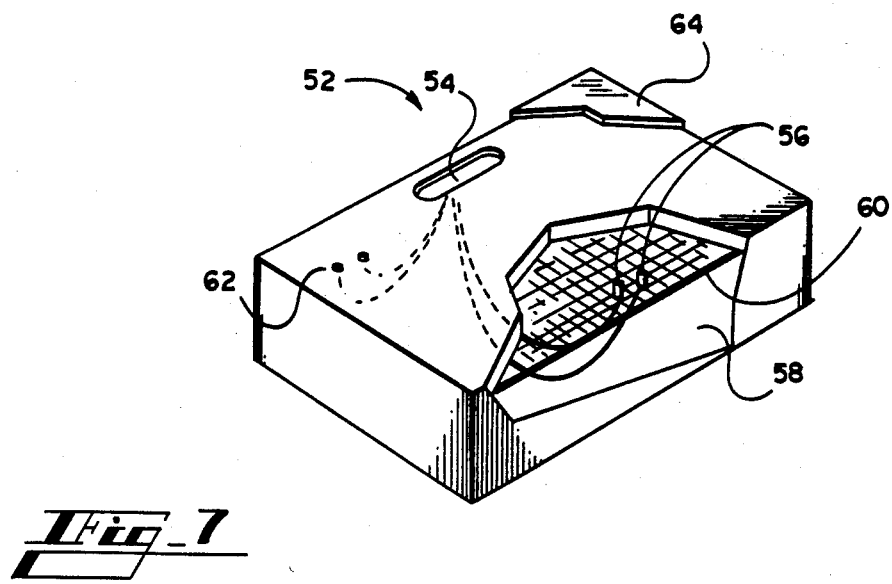
Fig_7

ESS EQUIPMENT TESTING DEVICE

TECHNICAL FIELD

This invention pertains to test equipment for testing the operation of selected features of an electronic switching system central office from the telephone subscriber's premises.

BACKGROUND ART

In a telephone communications systems, certain switching equipment is located in the telephone central office and other equipment is located on the subscriber's premises. For business subscribers and other subscribers requiring multiple lines or certain advanced features, a PBX (Private Branch Exchange) can be used to provide these features and services. Central offices equipped with Electronic Switching Systems (ESS) are able to provide modern advanced services such as call forwarding, call waiting, and a number of other features. A service available to telephone subscribers is ESSX service which essentially provides the advanced features and benefits of a PBX without the PBX hardware. The ESSX service is provided from the ESS central office with equipment that is monitored and maintained by the telephone company.

On the subscriber's premises, the telephone company provides test jacks known as RJ21X jacks. On most cutovers to the ESSX service, vendor technicians do their cross-connect work at the same time that telephone company technicians are cutting over to the ESSX service and the telephone marketing technicians are testing the station features. On many cutovers, subscriber equipment rooms containing the RJ21X jacks are located in areas that are not easily accessed and do not have enough space for marketing and vendor technicians to work at the same time. Consequently, someone has to wait. Accordingly, it will be appreciated that it will be highly desirable to eliminate the time wasted waiting for the equipment vendors to do their cross-connect work on the RJ21X jack.

When access to the test jack is gained, it takes a number of seconds to attach a test set onto the closely spaced terminals of the test jack using alligator clips. On some tests, two marketing technicians are required to test the service features effectively. Accordingly, it will be appreciated that it would be highly desirable to reduce the amount of time to clip a test set onto the test jack and to reduce the number of persons required to test service features.

Sometimes, the test jacks are hard to access. Some equipment rooms are located in areas that are not easily accessed and the RJ21X jacks are mounted in areas such as closets, under stairwells, high on the walls, and in narrow openings. Working in cramped, unpleasant equipment areas causes premature fatigue and increases wasted time. Accordingly, it will be appreciated that it would be highly desirable to test service features from a convenient location.

SUMMARY OF THE INVENTION

The present invention is directed to overcoming the problems set forth above. Briefly summarized, a device to facilitate testing of ESS communication systems incorporating a number of predetermined test points includes a housing. A plurality of electrodes are mounted on the housing and are connectable to the test points in the communication system. Means are provided for correlating the electrodes and the test points so that a selected electrode is an extension of a selected test point.

The present invention provides a portable test set which simulates a test jack. The device is portable and can be connected to the RJ21X test jack located in a crowded equipment room and used to simulate the jack in a remote location free of equipment and personnel.

It is an object of the present invention to eliminate the time lost by waiting on equipment vendors to do cross-connect work. Waiting time is eliminated by performing tests while the vendors are doing the cross connect work. Both marketing technicians and equipment vendors can work at the same time because the present invention plugs into the RJ21X test jack, effectively extending the jack to a location convenient for marketing technicians to perform service tests, while leaving the jack fixed in its original location convenient for equipment vendors to do cross-connect work.

Another object of the present invention is to reduce the amount of time required to clip test sets onto the test jack and test ESSX station features. This object is achieved by forming the electrodes from studs. The studs are easily grasped by the alligator clip connectors of the test set and are better spaced than the terminals of the RJ21X test jack for easier accessibility.

It is an object of the present invention to provide the ability to test features from a more convenient location. This object is achieved by providing a flexible cable connecting the electrodes with the terminals of the RJ21X test jack. The cable provides a plug connector mateable with a receptacle on the test jack, and has its other end terminated to the electrodes. The cable may consist of one segment of sufficient length or may consist of several shorter lengths joined together. The cable allows the test device to be moved to a convenient location and the spacing of the electrodes makes connecting a hand held test set much easier. These conveniences result in one person being able to perform tests which normally require two people thereby reducing the number of persons required to test features and saving time. An advantage provided by the present invention is improved customer satisfaction gained by reducing the amount of time that the customer has to be involved with the cut over of the equipment.

According to one aspect of the invention, a device for simulating a telephone equipment test jack having a number of test terminals comprises a receptacle and a plurality of electrodes. Each electrode has a free end and an end connected to the receptacle. The free end is configured for repeatedly being engaged by an alligator clip connector. A housing of encapsulation material is formed about the receptacle and electrodes fixing the receptacle and electrodes in position and insulating the electrodes from one another. Means are provided for correlating the electrodes and test terminals.

The encapsulated receptacle and electrodes form a unitary structure easily transported in a carrying case, such as a briefcase, with sufficient space for a connecting cable. The connecting case has a plug on either end for engaging the receptacle and the test jack. The unitary structure is very compact, light in weight, and inexpensive to manufacture.

Other aspects, objects, features and advantages will become apparent to those skilled in the art upon reading the following detailed description of the preferred embodiments in conjunction with the accompanying drawings and appended claims.

BRIEF DESCRIPTION OF THE DRAWINGS

FIG. 1 is a block diagram of a preferred embodiment of a telephone switching system illustrating a central office and a subscriber equipment room incorporating an RJ21X test jack with a receptacle in accordance with the present invention.

FIG. 2 is a plan view of the receptacle of FIG. 1.

FIG. 3 is a perspective view of a preferred embodiment of an equipment testing device constructed in accordance with the present invention including a connector for connecting with the RJ21X jack illustrated in FIG. 1.

FIG. 4 is a partial cross sectional view of the equipment testing device of FIG. 3 illustrating a test electrode in greater detail.

FIG. 5 is a perspective view of another preferred embodiment of an equipment testing device similar to FIG. 3 but illustrating a separate connecting cable.

FIG. 6. is a partial cross sectional view similar to FIG. 4 but illustrating another preferred embodiment.

FIG. 7 is a partially cut away perspective view of another preferred embodiment of an equipment testing device constructed in accordance with the present invention.

DETAILED DESCRIPTION OF THE PREFERRED EMBODIMENTS

Referring to FIG. 1, a telephone communications system 10 includes a central office, such as an electronic switching system central office 12, connected to remotely located subscriber equipment, including a RJ21X test jack 14 housed in an equipment room or cabinet on the subscriber's premises. With the ESS central office 12, ESSX service is available and includes features such as direct inward and outward dialing, call forwarding, uniform call distribution with queuing, call holding, three way calling, call pick-up, call waiting, speed calling, call transfer, automatic route selection, station message detail recording, and outgoing trunk queuing. ESSX service provides the advanced features and benefits of a PBX system without PBX hardware or PBX maintenance concerns.

Referring to FIGS. 1 and 2, the test jack 14 has four vertical columns with fifty terminals in each column. The terminals in the two left hand columns are electrically connected as are the two terminals in the right hand column so that electrically, there are two vertical columns of fifty terminals each. The fifty terminals are connected to the receptacle 16 of a flat connector. Preferably, the flat connector is a cinch type connector having a bracket 18 with openings therein for receiving a fastener 20 to secure the plug portion of the fastener in electrically conductive contact with the receptacle of the connector 16. The fastener 20 is preferably formed of synthetic materials which adhere when pressed together. While other types of connectors could serve just as well in making electrical connections, the cinch type connector is preferred because the connection is made without the use of screws or bolts. Time is saved by simply pulling the fastener tight about the connector instead of having to adjust screws.

Referring to FIG. 3, an ESS equipment testing device 22 simulates the test terminals of the RJ21X jack 14. The equipment testing device 22 includes a base 24 and a cover 26 hingedly connected to the base 24. The base 24 and cover 26 cooperate to open and close in a manner similar to a briefcase, or other similar carrying case. Preferably, the equipment testing device 22 is constructed of wood with the base portion 24 having a handle 28 attached to a front panel 30. The front panel 30 is preferably hingedly connected to a bottom panel 31 and opens outwardly exposing the interior of the base portion 24 of the testing device 22. An insulator plate 32 is preferably attached to the base portion 24 by screws or the like. When constructed of wood, the corners may be dove-tailed or connected in another suitable manner, as is well known in the art, to form a strong joint. Similarly, the insulator panel 32 is joined to the base portion 24 forming a strong rigid structure. The insulator panel 32 is preferably constructed of plywood but other insulating materials may also be used. An opening may be provided in the insulator panel 32 or, more preferably, a space is left between the top edge of the insulator panel 32 and the rear panel of the bottom portion 24 for the connector cable 34.

On one end, the connector cable 34 has a plug mateable with the receptacle 16 of the test jack 14. As illustrated, the cable 34 contains twenty-five cable pairs corresponding to the number of terminal pairs of the RJ21X jack to be extended and simulated. The cable 34 is terminated at the insulator panel 32.

Referring to FIG. 4 each conductor of the cable is terminated at a screw or more preferably a stud 36. Each conductor is secured on the under side of the insulator panel 32 between two nuts 38 and 40. The nut 40 secures the cable conductors against the nut 38 insuring firm electrical contact from the conductor 34 to the stud 36. On the top side of the insulator panel 32, a third nut 42 acts in concert with nut 38 to fasten the stud 36 on the insulator panel 32 and maintain its position during use.

The top portion of the stud 36 is called an electrode because it is electrically connected through the stud 36, nuts 38, 40 and conductor 34 back to the RJ21X test jack. Each electrode 36 is an extension of a selected terminal from the jack. There is one electrode for each of the fifty conductors of the cable corresponding to the fifty vertical terminals on the RJ21X jack to be simulated (FIG. 1). The electrode is recessed below the top of the plywood. The plywood is preferably reamed or bored a sufficient distance around the electrode to ensure easy attachment and removal of alligator clips associated with hand held test sets. The stud 36 diameter is convenient for facilitating quick and easy wire connections and engagement with the jaws of standard alligator clips, and is preferably constructed of brass or other conductive material. As an alternative construction, each stud may be a screw driven to protrude through the insulator 32 so that an electrode is exposed for engaging a hand held test set and a portion is exposed for making electrical contact with conductors of the cable 34. If a screw is used, the top nut 42 will not be necessary since the screw would threadingly engage the insulator material. Similarly, the bottom nuts 38 and 40 may no longer be necessary because the conductors of cable 34 can be terminated on the protruding portion of the screw without the need for the nuts.

The insulator panel 32 is illustrated with a number of pairs of electrodes equal to the number of pairs of terminals on the test jack to be simulated. Because the limiting factor in the number of electrodes that can be placed in the equipment testing device 22 is the separation desired between electrodes, more pairs of electrodes could be added to the testing device 22 or some of the pairs of electrodes could be removed depending on the particular jack to be simulated.

Referring to FIGS. 3 and 4, the plywood insulating panel 32 is preferably covered with a thin sheet of plexiglass 44 to be written upon with a grease pencil. The number or name of each electrode corresponding to a test jack terminal can be written upon the plexiglass 44 and later erased. As an alternative, the plywood surface may be treated or coated with a layer of material for writing upon with an alcohol based pen of the type used in chalkless chalkboards for example. The grease pencil and plexiglass are preferable, however, because the grease pencil is more resistant to inadvertent erasure than the writing of the alcohol based pen.

Operation of the electronic switching system equipment testing device is believed to be apparent from the foregoing description, but a few words will be added for emphasis. A test jack 14 is placed on the subscriber's premises to enable telephone company employees and other authorized personnel to test certain features of the equipment in the central office 12 and on the subscriber's premises. The test jack is physically wired to different test points or test locations in the communications switching system. Test points may be added from time to time but test points essentially do not change once wired to the test jack 14 and can differ from one subscriber to the next. The test points to which the test jack 14 is connected are also connected to the receptacle 16. The receptacle 16 mates with a connector plug attached to a connector cable 34. A fastener 20 attached to a bracket 18 secures the connection between the plug and receptacle 16. The connector cable 34 is part of the equipment testing device 22 and connects the equipment testing device 22 with the test jack 14.

The equipment testing device 22 extends the terminals of the test jack 14 to the testing device 22. The device 22 can be located away from the test jack, limited only by the length of the connector cable 34. The connector cable 34 may consist of one segment with one end connected to the various electrodes and the other end outfitted with the plug mateable with the receptacle 16. The connector cable 34 may also consist of several extension segments with each segment having a plug connector on one end and a receptacle on the opposite end so that the extension segments can be connected on one end to the receptacle 16, and on the other end to the plug connector attached to cable 34. Preferably, the extension cable segments are conveniently stored in the bottom portion 24 of the device 22 and are inserted into and removed from the storage area by folding open the front panel 30 of the testing device 22.

Because the test points represented by the terminals of the test jack 14 can vary from subscriber location to subscriber location, the writeable surface cover 44 can be used to label the terminals so that the user of the equipment test set 22 will know which terminals the test set 22 is simulating.

Referring to FIG. 5, another preferred embodiment of the ESSX service equipment testing device is illustrated wherein like components carry the same reference numbers as in FIG. 3 but indicated with a prime"'". The testing device 22' includes a base portion 24' and a cover portion 26'. A handle 28' is preferably attached to the front panel 30' of the base portion 24'. The stud electrodes 36' are attached to the plywood insulator 32' which, in turn, is attached to the base portion 24'. The base portion 24' preferably has a receptacle 46 attached to the plywood insulator and connected to the studs 36' on the interior of the base portion 24'. The receptacle 46 may alternatively be positioned on the front panel 30 or on a side panel 48. Positioning the receptacle 46 on the side panel 48 has the advantage of permitting maximum access to the electrodes 36' without interference from the connecting cable 34'. Of course, positioning the receptacle 46 on the plywood insulator has the advantage of protecting the receptacle from excessive dust and other hazards when the cover 26' is closed. For maximum flexibility, a receptacle can be located on a front or side panel as well as the insulator panel.

The base portion 24' is made more compact so that there is insufficient room to store cable on the interior of the base portion 24' behind the front panel 30'. Therefore, the front panel 30' is not hingedly connected. In response to the base 24' being made thinner, the cover 26' is made thicker to provide room for storing the cable 34'. Preferably, the cover 26' is removably attached to the base portion 24' so that when the testing device 22' is in use, the cover can be moved out of the way. With this configuration, the extension cable 34' has a connector plug 49a on one end and a connector plug 48b on the other end. One end 49a of the connector cable 34' plugs into the receptacle 46 and the other end 49b of the cable engages the receptacle 16 on the RJ21X test jack 14. The cover 26' has one or more brackets 50 secured to the inside thereof for storing the connector cable 34'.

Operation of the embodiment of FIG. 5 is similar to the operation of the embodiment of FIG. 3 with slight differences. Preferably, the ESS equipment testing device 22' is opened and the cover 26' is detached from the base portion 24'. The extender cable 34' is removed from the holding brackets 50 and unwound. One end, 49a for example, is inserted into the receptacle 46 and the other end 49b is attached to the receptacle 16 on the test jack 14. The receptacle 46 may be the same as receptacle 16 or it may be any simple to use type to hold the plug 49a securely in position. If the extension cable 34' is of insufficient length, other cable segments may be attached to extend its length. When the connector cable 34' is installed, the testing device 22' is ready to perform tests. To make testing easier for the operator of the testing device, terminal names or terminal numbers may be written upon the writing surface 44 to identify particular electrodes so that these electrodes can simulate the terminals of the test jack 14. Finally, the testing device operator uses a hand held or other alligator clip test set to perform various tests.

It can be appreciated that the embodiment of FIG. 5 offers certain advantages because the cover can be removed making the testing device at the test sight more compact requiring less room. Also, excess connector cable can remain wound in the cover in a neat arrangement instead of being spread about the floor. This improves the appearance of the work sight which is helpful in conducting speedy, efficient tests. The fact that the cable is a separate piece that is plugged into the testing device and allows the position of the testing device to be located and oriented for maximum comfort and efficiency. By having an alternate side panel receptacle, the electrodes remain completely free of interference with the cable for unobstructed testing.

Referring to FIG. 6, another embodiment is illustrated wherein the insulating panel 32' is flat instead of having recesses as as in FIG. 4. The stud electrode 36' extends a preselected distance above the flat surface of the insulating panel 32'. The preselected distance is sufficient for the stud electrode 36' to be engaged by the jaws of an alligator clip attached to a hand test set. The writing surface 44' defines an opening about the electrode 36' to facilitate use of the alligator clips. The electrode 36' does not extend above the upper surface of the writing surface 44'. The writing surface may be plexiglass for use with a grease pencil or paper or a paper-like product with a surface suitable for erasable writing with an alcohol based pen or other suitable instrument. A combination of an insulating paper material with a thin sheet of plexiplass offers the erasable writing advantages of plexiglass with a reduction in weight.

Referring to FIG. 7, another preferred embodiment is illustrated offering an equipment testing device 52 in a compact unitary structure which can be transported in a briefcase or the like. The device 52 includes a receptacle 54 wired to test electrodes 56. The electrodes 56 have a size and configuration sufficient for being repeatedly engaged by the jaws of the alligator clip connector of a handheld test set. The electrodes 56 may be crimp type connectors attached to the ends of the wires attached to the receptacle or may simply be wires of sufficient guage to withstand repeated biting by the jaws of the alligator clips.

The receptacle 54, wires and electrodes 56 are encapsulated to form a unitary structure 52 with the mating portion of the receptacle 54 exposed and with a predetermined length of the electrodes 56 exposed. The encapsulant 58 can be any of several encapsulating materials well known in the art. One material is rigid polyurethane foam which provides strength and rigidity with little increase in weight. To further increase strength and stability, a reinforcing grid, such as fiberglass mesh 60, can be used prior to encapsulation. The electrodes 56 protrude through openings in the mesh 60 and are held in position thereby while the encapsulant 58 cures.

The electrodes 56 are preferably positioned in recesses 62 in the top surface of the encapsulant 58 and do not extend beyond the highest elevation of the top surface. A writing surface, such as a plexiglass cover 64, can be installed on the top surface of the cured encapsulant 58 to correlate the electrodes 56 and terminals of the test jack 14. The plexiglass cover 64 can be fastened using an adhesive or other fastening means. The electrodes 56 and test jack 14 are connected using a cable or connected cable segments mateable with the receptacles 16 and 54.

Operation of the unitary structure 52 is simple. The unitary structure 52 is transported to the work site in an ordinary briefcase with a connecting cable also transported in the briefcase. Because the unitary structure is polyurethane foam filled, it is light in weight and easy to carry. Encapsulation minimizes the thickness of the structure so that there is room for the structure and connecting cable in an ordinary briefcase. At the work site, the briefcase is opened and the cable is removed and plugged into the receptacles 16 and 54. A grease pencil is used to write the identification of the electrodes on the plexiglass 64 so that a correlation exists between the electrodes 56 and test terminals of the test jack 14. The handset used to make tests is now attached through openings in the plexiglass 64 to the desired electrodes 56.

It will now be appreciated that an equipment testing device has been presented which reduces the amount of time required to attach alligator clips and test ESSX service features. Also, the number of persons required to test features is reduced by the equipment testing device. With the equipment testing device, one person can easily use two handheld test sets and test features by himself. Without the equipment testing device, it normally requires two marketing people to test features effectively. On large systems, two individuals using this new equipment testing device can do the testing that normally requires three or four people, significantly saving valuable time.

A great immediate advantage of the equipment testing device is that it eliminates the time wasted on waiting for equipment vendors to do their cross-connect work on the RJ21X jack. When the equipment testing device is connected to the connector receptacle of the test jack, a marketing technician and the vendor can work from the test jack without either having to wait. On most cutovers, vendors must do their cross-connect work at the same time the telephone company is cutting over to the ESSX service and marketing personnel are testing the station features. Using the old testing process, someone would have to wait. Experience on a recent ESSX service cut-over of approximately 200 stations indicates that marketing personnel would have lost approximately three hours or more due to waiting on the equipment vendor or vendor interruptions. With the new equipment testing device no time is lost. Not only is less time lost due to the fact that waiting is no longer necessary, but work goes more smoothly because the equipment testing device can be moved away from the jack for performing the tests. This means that the technician can be removed from the closet, stairwell, or other cramped quarters provided for the equipment. This also removes the technician from the noise and distractions connected with the equipment room. Conducting the tests from outside of the equipment room provide marketing personnel with more space, less noise and congestion, and fewer distractions, promoting efficiency.

While the invention has been described with reference to a preferred embodiment, it will be understood by those skilled in the art that various changes may be made and equivalents may be substituted for elements of the preferred embodiments without departing from the true spirit and scope of the invention. In addition, many modifications may be made to adapt a particular situation and material to the teachings of the invention without departing from the essential teachings of the present invention. For example, a removable writing surface may be substituted for the erasable writing surface without departing from the present invention.

I claim:

1. A device to facilitate testing of communications systems having a number of predetermined test terminals, comprising;

a housing defining a plurality of recesses:

a plurality of electrodes mounted on said housing each electrode being positioned in a recess of said plurality of recesses, said recess being of a size sufficient for said electrode to engage a removable electrical connector;

means for connecting said plurality of electrodes to said number of predetermined test terminals; and means for correlating said electrodes and said test terminals so that a selected electrode is an extension of a selected test terminal.

2. The device of claim 1, wherein said housing includes:

a base;
an insulator mounted on said base supporting said plurality of electrodes; and
a cover mateable with said base for controllably enclosing said insulator and electrodes therein.

3. The device of claim 1, wherein said housing includes:
a base having bottom, front and side panels; and
an insulator supporting said plurality of electrodes and forming a top panel and defining an interior space in the base between said panels.

4. The device of claim 3, wherein said front panel is hingedly connected to said bottom panel and opens revealing said interior space.

5. The device of claim 4, wherein said interior space is sufficient for terminating a connecting cable to said electrodes and for storing additional lengths of cable.

6. The device of claim 3, wherein said interior space is filled with a connecting cable terminating at said plurality of electrodes.

7. The device of claim 3, wherein said side panel includes a connector plug attached to said electrodes in said interior space.

8. The device of claim 3, including a connector plug attached to said insulator and connected to said electrodes in said interior space.

9. The device of claim 2, including means, attached to said cover, for storing a connecting cable.

10. The device of claim 1, wherein said electrodes are recessed below said surface of said housing.

11. The device of claim 1, wherein each electrode of said plurality of electrodes is positioned in an opening in said housing with either end of said electrode exposed for making electrical connection.

12. The device of claim 11, wherein said housing is constructed of wood and said electrode threadably engages said wood.

13. The device of claim 11, wherein said electrode is held in position by first and second threaded fasteners engaging threads on said exposed ends.

14. The device of claim 13, including a third threaded fastener engaging one of said exposed ends for securing a connecting cable conductor to said electrode.

15. A device to facilitate testing of communications systems having a number of predetermined test terminals, comprising:
a housing having a surface;
a plurality of electrodes mounted on said housing and recessed below said surface of said housing;
means for connecting said plurality of electrodes to said number of predetermined test terminals;
means for correlating said electrodes and said test terminals so that a selected electrode is an extension of a selected test terminal; and
an erasable writing surface positioned on said housing surface.

16. A device for simulating a telephone equipment test jack having a number of test terminals, comprising:
a base having a bottom panel and side panels forming an open box;
an insulator panel mounted on said base closing said open box, one of said panels being moveable from a closed position at which the interior of said box is concealed to an open position at which the interior of said box is exposed;
a plurality of electrodes mounted on said insulator panel;
a cover engageable with said base forming a closed structure about said mounted electrodes; and
means extendable from said closed box to said test jack for energizing said electrodes whereby said electrodes electrically simulate said test terminals.

17. The device of claim 16, wherein said interior of said box is sufficient for storing a length of connecting cable received in said interior when said moveable panel is opened.

18. A device for simulating a telephone equipment test jack having a number of test terminals, comprising:
a base having a bottom panel and side panels forming an open box;
an insulator panel mounted on said base closing said open box;
a plurality of electrodes mounted on said insulator panel;
a cover engageable with said base forming a closed structure about said mounted electrodes;
means extendable from said closed box to said test jack for energizing said electrodes whereby said electrodes electrically simulate said test terminals; and
a receptacle mounted on one of said panels and connected to said electrodes.

19. The device of claim 16, including means attached to said cover for storing a connecting cable.

20. The device of claim 16, wherein said electrodes are recessed below the surface of said insulator panel.

21. The device of claim 16, wherein said insulator panel defines recesses with each electrode of said plurality of electrodes positioned in a recess, each recess being of a size sufficient for said electrode positioned therein to be engaged by a removable electrical connector.

22. The device of claim 16, wherein each electrode of said plurality of electrodes is positioned in an opening in said insulator panel with either end of said electrode being exposed for making electrical connections.

23. The device of claim 22 wherein said insulated panel is constructed of wood and said electrodes threadably engage said wood.

24. The device of claim 22, wherein said electrode is held in position by first and second threaded fasteners engaging threads on said exposed ends of said electrode.

25. The device of claim 24, including a third threaded fastener engaging one of said exposed ends for securing a connecting cable conductor to said electrode.

26. The device of claim 16, wherein said insulator panel has a top surface with each electrode of said plurality of electrodes extending above said top surface a preselected distance.

27. The device of claim 16, including an erasable writing surface, positioned on said insulator panel, defining openings with each electrode extending into one of said openings.

28. The device of claim 27, wherein a top surface of said writing surface is at a higher elevation than said electrodes.

29. A device for simulating a telephone equipment test jack having a number of test terminals, comprising:
a base having a bottom panel and side panels forming an open box;
an insulator panel mounted on said base closing said open box;
a plurality of electrodes mounted on said insulator panel;

a cover engageable with said base forming a closed structure about said mounted electrodes;

means extendable from said closed box to said test jack for energizing said electrodes whereby said electrodes electrically simulate said test terminals; and an erasable writing surface positioned on top of said insulator panel.

30. A device for simulating a telephone equipment test jack having a number of test terminals, comprising:

a receptacle;

a plurality of electrodes each having a free end and another end connected to said receptacle, said free end having a size and configuration sufficient for being repeatedly engaged by an electrical connector;

a housing of encapsulation material formed about said receptacle and said electrodes fixing said receptacle and said electrodes in position; and means for correlating said electrodes and said test terminals.

31. The device of claim 30, including a reinforcing material having openings with said electrodes protruding through said openings.

32. The device of claim 31, wherein said reinforcing material is a fiberglass mesh.

33. The device of claim 30, wherein said housing defines a top surface and recesses in said top surface and wherein said electrodes are positioned in said recesses.

34. The device of claim 33, including an erasable writing surface positioned on said top surface.

35. The device of claim 33, including a writing surface fastened to said housing.

* * * * *